United States Patent
Yang

(10) Patent No.: US 10,660,186 B2
(45) Date of Patent: May 19, 2020

(54) SMART ILLUMINATING CONTROLLER

(71) Applicant: Hangzhou LMenergysolution lighting co., Ltd, Hangzhou, Zhejiang (CN)

(72) Inventor: Limin Yang, Zhejiang (CN)

(73) Assignee: Hangzhou LMenergysolution lighting co., ltd, Hangzhou, Zhejiang (CN)

( * ) Notice: Subject to any disclaimer, the term of this patent is extended or adjusted under 35 U.S.C. 154(b) by 0 days.

(21) Appl. No.: 16/244,067

(22) Filed: Jan. 9, 2019

(65) Prior Publication Data

US 2019/0150251 A1    May 16, 2019

(51) Int. Cl.
| | |
|---|---|
| *H05B 33/00* | (2006.01) |
| *H05B 47/19* | (2020.01) |
| *H04L 12/28* | (2006.01) |
| *H05B 45/00* | (2020.01) |
| *H05B 45/10* | (2020.01) |
| *H05B 47/11* | (2020.01) |
| *H05B 47/16* | (2020.01) |
| *H05B 47/105* | (2020.01) |

(52) U.S. Cl.
CPC ......... *H05B 47/19* (2020.01); *H04L 12/2816* (2013.01); *H05B 45/00* (2020.01); *H05B 45/10* (2020.01); *H05B 47/105* (2020.01); *H05B 47/11* (2020.01); *H05B 47/16* (2020.01); *H04L 2012/2841* (2013.01)

(58) Field of Classification Search
CPC ............ H05B 37/0272; H05B 37/0227; H05B 37/0281; H05B 33/0872; H05B 33/0803; H05B 33/0854; H05B 37/0218; H05B 33/0809; H05B 33/0857; H05B 33/0845; H05B 33/089; H02J 9/02; H02J 9/065; H02J 7/34; H02J 7/0068; H02J 7/345; H02J 9/061; H02J 13/0017
See application file for complete search history.

(56) References Cited

U.S. PATENT DOCUMENTS

2017/0223807 A1 *  8/2017  Recker ............... H05B 37/0272

* cited by examiner

*Primary Examiner* — Monica C King

(57) ABSTRACT

The application discloses a smart illuminating controller which comprises transmitters and receivers. The transmitter comprises a PCB, a battery case and a shell. A Fresnel lens is at the bottom of the shell; motion detectors, light sensors and a Bluetooth module with a microcontroller are integrated on the PCB. The controller set the lights with a certain brightness according to the environment, which save the energy while provide sufficient lightings. The lightings are controlled automatically under different scenes by setting the sensitivity, distance and time delay. The demand for lightings is determined by the number of triggering signals sent by the motion detectors (5) received by the CPU at a given time. The application adopts the Bluetooth module. The time delay is able to be set infinite. The brightness for how long after the time delay is able to be set separately to meets different requirements of the scenes.

8 Claims, 4 Drawing Sheets

SMART ILLUMINATING CONTROLLER

CROSS REFERENCE OF RELATED APPLICATION

This application claims priority under 35 U.S.C. 119(a-d) to CN 201811486372.4 filed Dec. 6, 2018.

BACKGROUND OF THE PRESENT INVENTION

Field of Invention

The present invention relates to the smart illuminating field, and more particularly to a smart illuminating controller.

Description of Related Arts

Staircases and aisles are temporarily need lightings. In order to avoid the lights turning on for a whole day a light-controlled human induction LED is adopted to replace the ordinary LED. The serving time of the light is thus increased and the power consumption is decreased. The human induction LED is turned off while nobody at sight and turned on when the surrounding is gloomy and human is detected. The conventional technology has disadvantages such as there are no lights between staircases because the lights are turned on after people reach one staircase; or the time delay is not enough for people to pass through an aisle.

The present invention is able to meet various needs for lights under different scenes. The conventional technology remotely controls the lights through internet and lacks detailed disclosure on how to realize automatic control of the lights under different scenes. The conventional system is complex. The installation and commissioning are difficult accordingly.

SUMMARY OF THE PRESENT INVENTION

An object of the present invention is to provide a smart illuminating controller to solve the problems of the conventional technology.

Technical solutions are provided as below:

The smart illuminating controller, comprising transmitters and receivers, wherein each of the transmitters comprises a PCB (printed circuit board), a battery case and a shell; wherein a Fresnel lens and a solar panel are at a bottom of the shell; motion detectors, light sensors and a Bluetooth module with a microcontroller are integrated on the PCB;

wherein the motion detectors detect motions of people or vehicles;

wherein the light sensors detect a intensity of lights of surroundings;

wherein users set parameters for the transmitters with a cell phone or a computer; the transmitters communicates with the receivers; the receivers intercept instructions from the transmitters and control lights; the receivers capable of being set to intercept signal from certain transmitters; signals are able to be relayed from the transmitters to the receivers; a relay network of wireless signals is formed in a controllable range; the transmitters or repeaters are added for long distance Furthermore, the receiver communicates with the transmitters to control a light or the lights.

Furthermore, the magnets are placed on a bottom of each of the transmitters; the magnets hold the transmitters on the lights, iron keels on the ceiling or various iron tubes.

Furthermore, the controller is fixed on ceiling, walls or other positions by double-sided tapes.

Furthermore, the receivers intercept the signals wireless; the receivers connects the light or the lights with two ac input power wires, two output power wires and two light tuning wires.

Furthermore, the transmitter adopts Bluetooth module of micro consumption; a CPU of the motion detectors is hibernated by the microcontroller program while no triggering signals are detected; the transmitter is powered by three 5# batteries. The batteries are replaced every three years normally.

Furthermore, the transmitter adopts the Bluetooth module of the micro consumption; a CPU of the motion detectors is hibernated when no triggering signals are detected; the transmitter is powered by the solar panel and rechargeable batteries; the solar panel charges the rechargeable batteries when the lights are turned on or at day time, wherein there is no need to replace the rechargeable batteries.

Furthermore, the controller adopts a collective control method; each of the transmitters controls plural receivers, while each of the receivers is controlled by plural transmitter; the lights are able to be pre-turned on before people arrived on the spot.

Furthermore parameters of the controller comprise sensitivity, distance, time delay, the lights after time delay. The controller supports multiple setting, group control, adjustable brightness, turning on/off the lights at a given time, setting and saving scenes, triggering pre-set scenes at a given time. The controller is able to determine brightness of environment according to a number of trigger signals sent by the motion detector received by a CPU at a given time.

Furthermore, the controller adopts Bluetooth or wifi for communication. A control network is formed by relaying the wireless signal, or Bluetooth mesh network group any controllers in a building and maintain communication and control of the controllers in the network. The lighting control network is able to access internet through routers or wireless communication protocol of mobile operators to control the lights remotely.

Furthermore, the controller is able to control other home appliance besides the lights, such as air conditioner, heater, TV set and etc. The air conditioner is automatically turned on when people in the room and turned off after people leave the room to save energy.

The benefits of the present invention are below.

The brightness of the lights is controlled according to the environment. The lights meet the demand of the people at low energy consumption. The lights are controlled automatically under different scenes by setting the sensitivity and time delay. The sensitivity of the detector is relatively low to avoid mal-operations caused by small animals. The sensitivity is relatively high in rooms in order for small actions of hands or head to trigger the detectors and the lights in the rooms do not turn off when there are people. The set sensitivity and distance increase in the classroom and conference room. The present invention controls the lights by setting an illuminance and adjusts the lights until the light reach the set illuminance according to environment illuminance detected by the light sensor. The present invention relies on the Bluetooth module to transmit information and is no need for cable. The time delay of the present invention is able to be set in multiple forms to meet the requirements of different scenes. The multiple setting is able to keep set a new time delay and the illuminance after the previous time delay and illuminance is set.

The present invention adopts a collective control method to turn on the lights before the users reach the spot according to the set parameters. Each of the receivers is able to be controlled by multiple transmitters and each of the transmitters is able to trigger multiple receivers to turn on light or lights. The lights do not turn off by mistake during class or conference by mistake. The number of triggering during time delay is able to be treated as another base for determine the demand for illuminance to automatically set the controller, such as in the bedroom. The present invention has great advantage over the previous invention, which is easy to install. If the user find where need light control just add a transmitter (by magnetic, double-sided tapes, or screws) in the area and set the transmitter to the desired status.

Each transmitter and receiver is able to relay wireless signals, all the controllers are able to communicate and control as long as there are transmitters or receivers within the effective range of the wireless signals. If the distance is long, a repeater is able to be added to form a group. The newest Bluetooth technology is able to group in the air without hardware. The lighting control web access the internet through a router or wireless communication protocol of mobile operators to realize remote setting, control and management.

Figure 1:
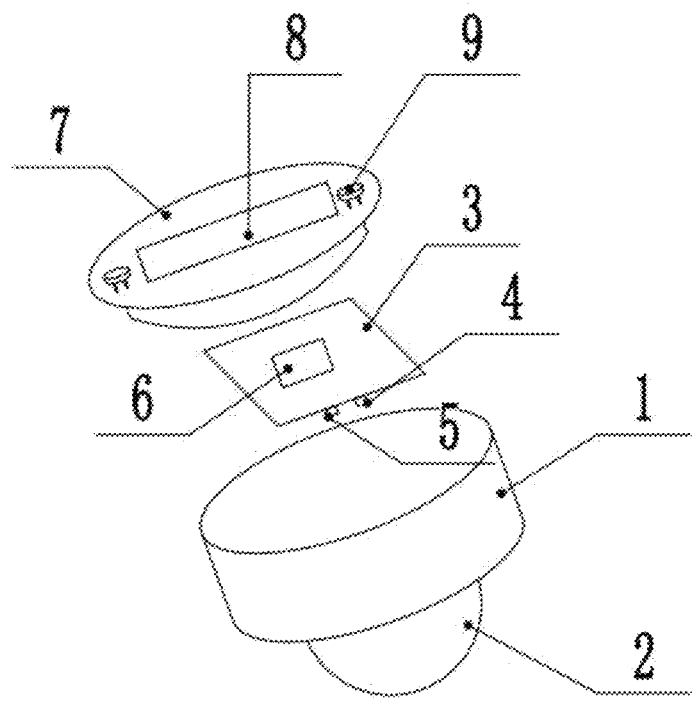
FIG. 1 is a perspective view of a smart illuminating controller.
Figure 2:
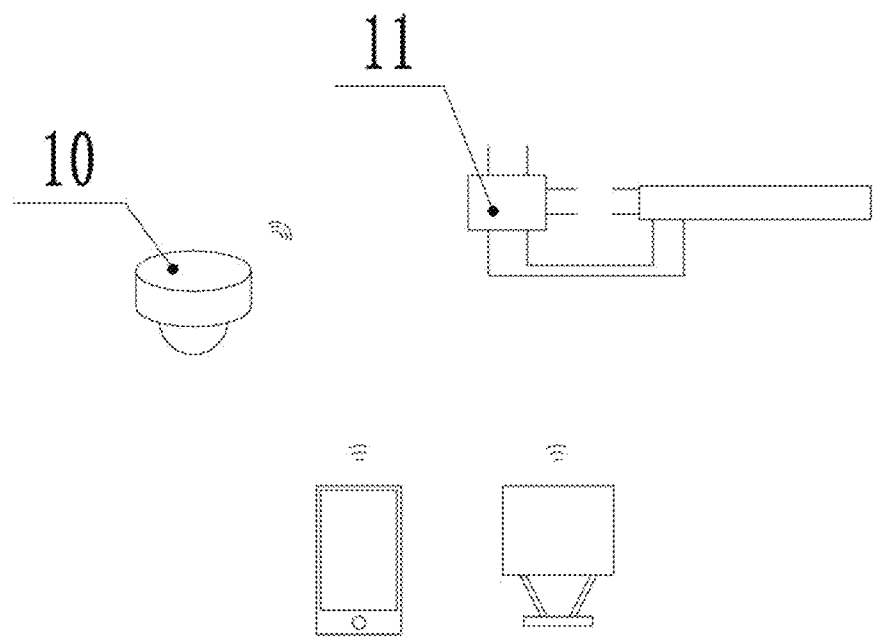
FIG. 2 is a perspective view of communications between the transmitter and receiver.

Element number: 1—shell; 2—Fresnel lens; 3—PCB; 4—light sensor; 5—motion detector; 6—bluetooth module; 7—bottom plate; 8—battery case; 9—megnet; 10—transmitter; 11—receiver; 12—solar panel

DETAILED DESCRIPTION OF THE PREFERRED EMBODIMENT

Referring to the drawings, according to preferred embodiments the present invention is illustrated in details.

Embodiment 1

Referring to FIG. 1, FIG. 2, FIG. 4 and FIG. 5, a smart illuminating controller, comprising transmitters 10 and receivers 11, wherein each of the transmitters comprises a PCB (printed circuit board) 3, a battery case 8 and a shell 1; wherein a Fresnel lens and a solar panel 12 are at a bottom of the shell; motion detectors 5, light sensors 4 and a Bluetooth module 6 with a microcontroller are integrated on the PCB 3;

wherein the motion detectors 5 detect motions of people or vehicles;

wherein the light sensors 4 detect a intensity of lights of surroundings;

Users set parameters for the transmitters 10 with a cell phone or a computer; the transmitters 10 communicates with the receivers 11; the receivers 11 intercept instructions from the transmitters 10 and control lights; the receivers capable of being set to intercept signal from certain transmitters; signals are able to be relayed from the transmitters 10 to the receivers 11; a relay network of wireless signals is formed in a controllable range; the transmitters or repeaters are added for long distance.

The receiver 11 communicates with the transmitters 10 to control a light or the lights.

Magnets 9 are placed on a bottom 7 of each of the transmitters 10; the magnets 9 hold the transmitters 10 on the lights, iron keels on the ceiling or various iron tubes.

The controller is fixed on ceiling, walls or other positions by double-sided tapes.

The receivers 11 intercept the signals wireless; the receivers 11 connects the light or the lights with two ac input power wires, two output power wires and two light tuning wires.

The transmitter 10 adopts Bluetooth module of micro consumption; a CPU of the motion detectors 5 is hibernated by the microcontroller program while no triggering signals are detected; the transmitter 10 is powered by three 5# battery.

The transmitter 10 adopts the Bluetooth module of the micro consumption; a CPU of the motion detectors 5 is hibernated when no triggering signals are detected; the transmitter 10 is powered by the solar panel 12 and rechargeable batteries; the solar panel 12 charges the rechargeable batteries when the lights are turned on or at day time, wherein there is no need to replace the rechargeable batteries.

The controller adopts a collective control method; each of the transmitters controls plural receivers, while each of the receivers is controlled by plural transmitter; the lights are able to be turned on before people arrived on the spot.

Parameters of the controller comprise sensitivity, distance, time delay, the lights after time delay; the controller supports multiple setting, group control, adjustable brightness, turning on/off the lights at a given time, setting and saving scenes, triggering pre-set scenes at a given time; the controller is able to determine brightness of environment according to a number of trigger signals sent by the motion detector at a given time.

The controller adopts Bluetooth or wifi for communication; a control network is formed by relaying the wireless signal or Bluetooth mesh network to group any controllers in a building and maintain communication and control of the controllers in the network; a lighting control network is able to access internet through routers or wireless communication protocol of mobile operators. An illuminating system is thus realized, which support remote setting, control and management.

Embodiment 2

The light sensor 4 detects and sends the environment illuminating signal to the CPU of the transmitter 10. The CPU compares the detected illuminating signal with the preset data and sends instructions to the receiver 11. The receiver 11 turns on the light and tunes the light with an approximation algorithm to approach the settings of the user.

The user is able to set the detected distance and sensitivity of the motion detector 5 by a cell phone of a computer to meet the requirement of different scenes. When the user is reading in the room, the sensitivity of the motion detector is increased due to the user does not have big movement. The motion detector detects signal when the arms and head moves not significantly. The time delay is set relatively long such as 10 minutes. It is not possible for the user to keep still without subtle move within 10 minutes. The time delay is set longer deliberately to prevent the light from turning off accidently. The light is on when the user is in the room. The distance and sensitivity of the detector are tuned lower when the transmitters are installed on the entrance, otherwise the motion detector is triggered by people outside the door.

The user is able to decide whether to turn off the light or to maintain the light after the time delay. In a shopping mall, 50% to 60% of the light is required for showing the goods when no people. When there are people, the motion detector is triggered to turn on all the light. In an underground garage, 10 to 20% of the light is required when no people. The time delay of the lights is able to be set to turn on with 20% capacity for a while or turn off when there is no motion. The way of time delay is able to be set multiple. The lights are turned on before people and cars reach the spot. To turn off the light does not compromise the normal lighting requirements.

The user is able to set collective groups. One transmitter 10 controls multiple receivers 11 and one receiver 11 is controlled by multiple transmitters. Requirements of different scenes are thus fulfilled. The conventional lights in the stair case are turned on when people reach a certain floor and no lights are between two floors. The present invention is able to turn on the light in the floor where people on and the floors below and above the people. One transmitter in a part is able to be set to control multiple surrounding lights. The light is turned on when there is people. The lights are turned on for two hours after the time delay with 50% capacity. The lights maintain 20% capacity or are turned off when no people in the area after the time delay to save the energy.

The present invention is able to be applied in the road lighting. A controller is installed on each of the street light. Several street lights on the forward direction are able to be set as a collective group. When people or vehicles passes the lights forward are turned on. When there are no people or vehicles the lights are tuned to a low illuminance.

Embodiment 3

The transmitter 10 adopts Bluetooth module of micro consumption 6. A CPU of the motion detectors 5 is hibernated by the microcontroller program while no triggering signals are detected. The CPU is triggered as soon as the motion detector receive the signals. The transmitter 10 is powered by three 5# battery. The service life is three years. Or, the transmitter 10 is powered by the solar panel and rechargeable batteries. There is no need to replace the rechargeable batteries, which simplifies the conventional lights and the lights become smart.

The transmitter 10 adopts Bluetooth or wifi for communication. The user is able to set parameters through an interface. The manufacturer installs serval scenes for people to choose. The user is able to modify the provided template to meet the requirements.

The transmitter 10 and the receiver 11 are communicated with Bluetooth. The receiver 11 feedbacks signals after receives the signals from the transmitter 10 to guarantee a safe communication. The transmitter 10 keeps sending out signals if does not get the feedback from the receivers. In order to extend the spread distance of the Bluetooth, the signals are sent at intervals and repeatedly to ensure the distant receiver 11 to receive the signals.

When the battery is low the indicator on the controller blinks and is shown on the cell phone or the computer.

A magnet 9 is placed on the bottom of the controller to simplify the modification of the conventional lighting system. The transmitter is fixed on the lights, iron keels on the ceiling or various iron tubes by the magnet.

The double-sided tape on the bottom is able to fix the transmitter on any smooth plane such as ceiling or walls.

Each transmitter 10 or receiver 11 works as a repeater, which is able to be grouped within the communication range of the Bluetooth to fulfil communication and control within the whole network.

The control group accesses the internet through the Bluetooth, wifi or routers and realizes remote set, control and management through wireless communication protocol.

When the transmitter 10 receiver 11 or the light does not work normally the transmitter 10 or the receiver 11 generates fault code which is shown on the terminal for technician to check.

Embodiment 4

Figure 3:
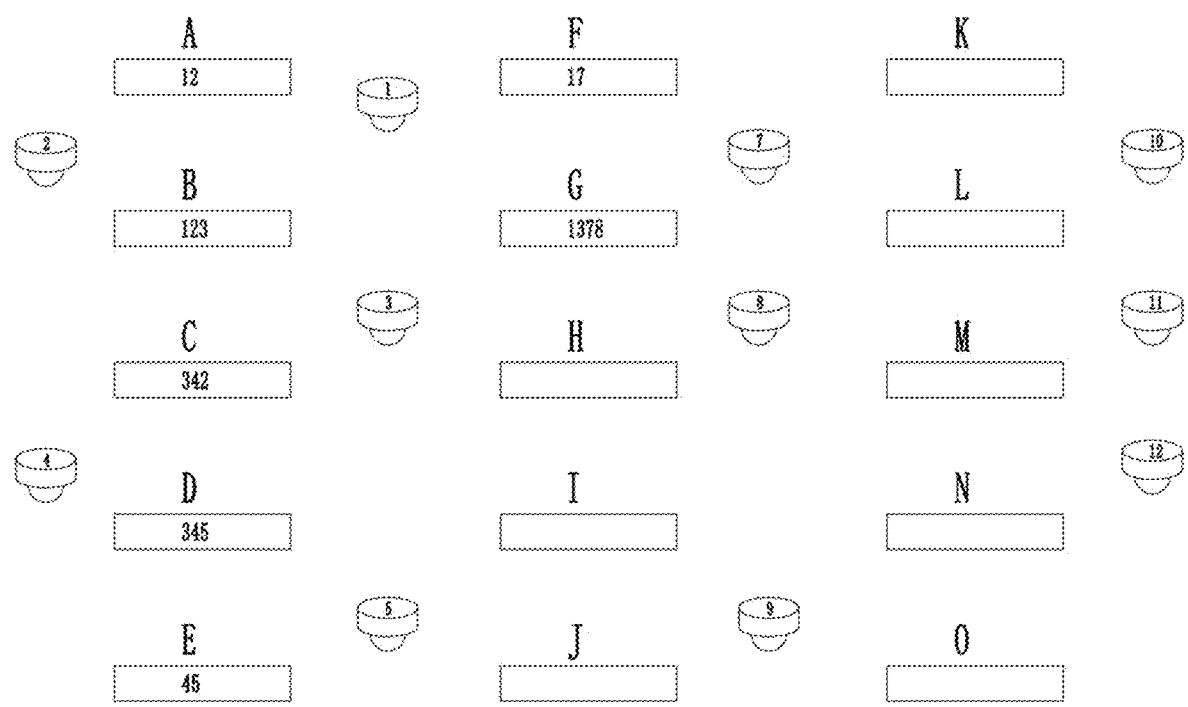
Figure 4:
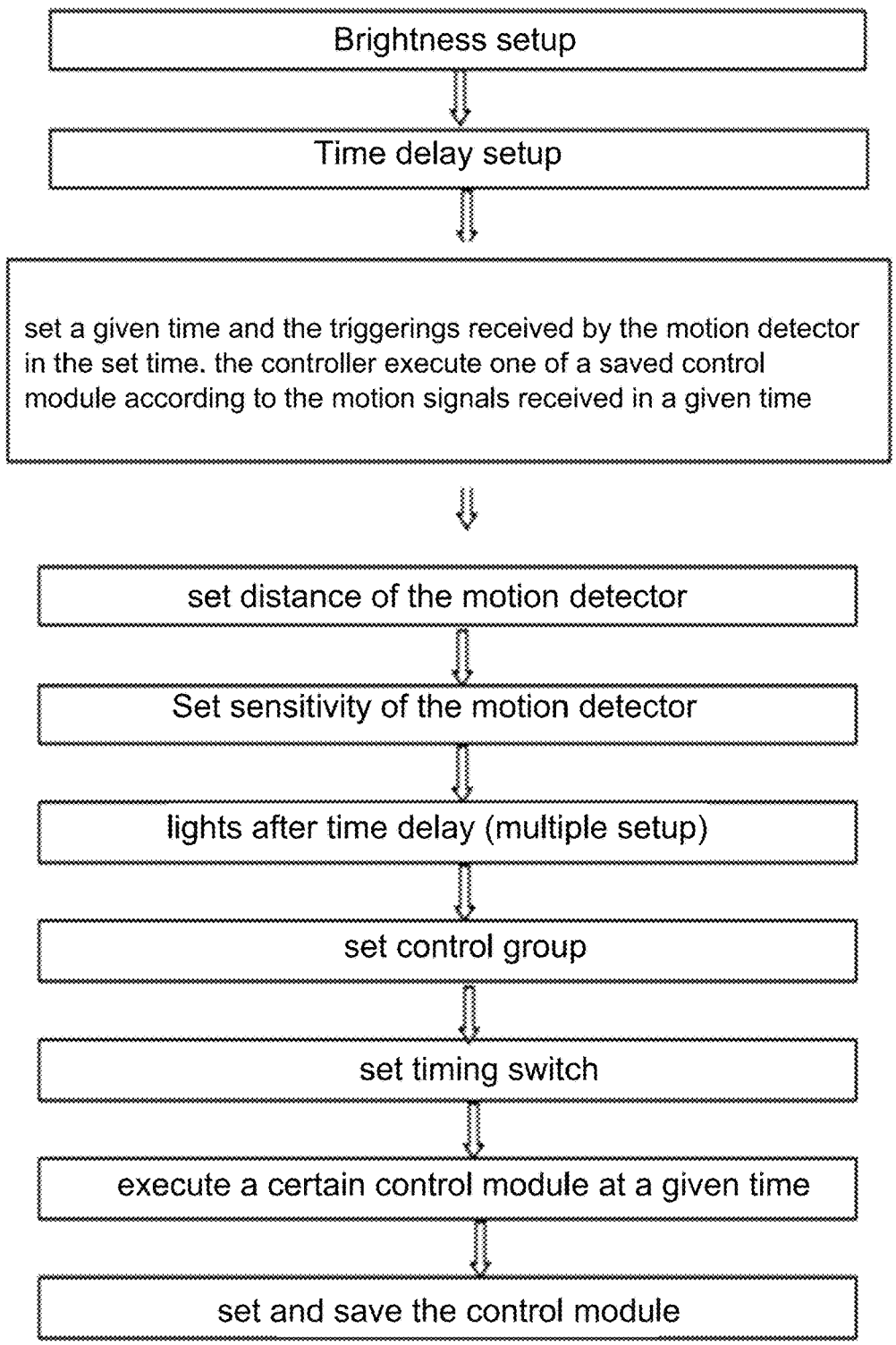
FIG. 4 is a flow chart for setting the parameters of the controller.
Figure 5:
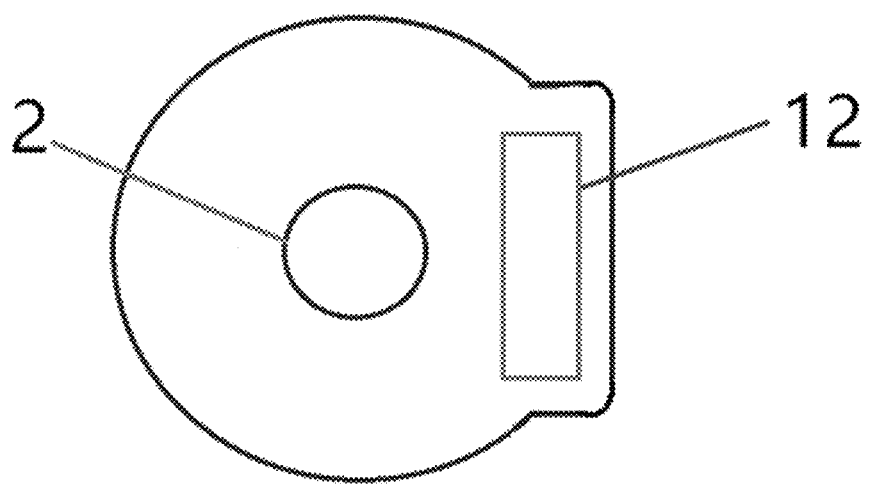
FIG. 5 is a perspective view of a bottom of a shell.

As shown in the FIG. 3, the Light A is controlled by transmitter 1 and transmitter 2; the Light D is controlled by transmitter 3, transmitter 4 and transmitter 5. The control group is thus set to ensure the light to be turned on when people does not reach Light D. The time delay is 10 minutes and the detected distance is 12 meters. The sensitivity of the setup is high. The light is turned on with a time delay of 10 minutes when the subtle movements of people within the detect range of transmitter 1 and transmitter 2 are detected. The light maintains a high illumination when there are people. The Light C is turned on before the people moves to the transmitter 2 because the transmitter C is also controlled by the transmitter 2.

The illumination of the light is pre-set by the user such as 200 lux. When the weather is gloomy and the Light A is not able to reach 200 lux the lights around the Light A are lighted up. When the sunlight shines through the window the Light A is tuned lower to reach 200 lux. A thoughtful distribution of the lights is able to fulfil the needs of the users and maintains the illumination at constant level which eases visual fatigue, improves working efficiency and reduces energy consumption.

Embodiment 5

The user is able to set and maintain scene templates which are able to be set to work on a certain time, such as in a bedroom. Different users have different habits which require different control templates and bring difficulty to the control. We set the below three scenes: 1. The sensitivity of the detector is 100%, the distance is 100%, the illumination is 180 lux, the time delay is 10 minutes; 2. The sensitivity is 100%, the distance is 100%, 50% illumination is 90 lux, the time delay is 10 minutes. If the time table of the user is sleep at 22:00 and get up at 6 am, scene 1 is chosen to work during 6 am top 21:30, scene 2 is chosen to work during 21:30 to 22:00 and scene 3 is chosen to work during 22:00 to 6:00. When the user enters the bedroom at 21:30 the lights are turned on with 50% illumination. The lights are turned on after 22:00 when big actions are detected. The detectors are hibernated. The lights give half illumination when the user gets up until 6:00. After 6:00 when the user is in the room the lights give full illumination and when nobody in the room the lights are turned off. When the sunlight shines through the window the illumination is tuned to the set parameters or the lights are turned off.

Three scenes are able to be pre-set and triggered based on the number of motion signals detected by the controller at a given time to control the lightings of the bedroom. Scene 1:

the sensitivity of the motion detector is 100%, the distance is 100%, the time delay is 10 minutes, the illumination is 1201 ux, six motion signals are received in 10 minutes; Scene 2: the sensitivity is 100%, the distance is 100%, the time delay is 10 minutes, the illumination is 80%, three motion signals are received within 10 minutes; Scene 3: the sensitivity is 30%, the distance is 100%, the time delay is 10 minutes, the illumination 50%, two motion signals are received within 10 minutes. When the detected number of motion signal is more than six at a given time the controller adopts Scene 1. When the detected number of motion signal is between three to six at a given time the controller adopts Scene 2. When the detected number of motion signal is less than two the controller adopts Scene 3. The lights are turned off in Scene 3 because the user does not have big movements and goes to sleep. When the user gets up the lights are trigger to light up with half illumination. In the successive 10 minutes with more frequent in movements the lights are triggered to operate according to corresponding scenes. The setup of the three scenes is complex. The manufacturer pre-set in the appliance for the user to modify few datas One skilled in the art will understand that the embodiment of the present invention as shown in the drawings and described above is exemplary only and not intended to be limiting. Any variations and modifications are within the protection range of the present invention.

What is claimed is:

1. A smart illuminating controller and corresponding mobile apps, wherein transmitters and receivers are able to be set and controlled through a blue tooth and a mobile; wherein the mobile apps is able to search and set the transmitters and the receivers; the transmitters and the receivers are able to be re-named for identifying by users; the transmitters and the receivers are set to different groups; the transmitters and the receivers are able to be set to different groups; a major group which contains different groups is set to meet needs of users; a super major group is set and named to meet different needs; the group, the major group or the super group are able to be controlled and tuned by a mobile; the group decides whether to start a motion sensor to enable the receivers to be controlled by the transmitters automatically or controlled manually; the group is also able to start light sensors; lights is able to be tuned according to changes of environment to remain a constant luminance.

2. The smart illuminating controller and the corresponding mobile apps, as recited in claim 1, wherein the group and the major group is set through the mobile apps and bluetooth to automatically control lightings by tuning sensitivity of the motion sensor, detection distance and time delay; wherein various combinations of time delays and luminous intensities are able to be set for different sections during a lighting period until the next signal is received.

3. The smart illuminating controller and the corresponding mobile apps, as recited in claim 2, wherein a number of motion signals is able to be set after the motion signals are received by the motion sensor within the time delay; a second time delay and luminous are set according to the number of the motion signals until no motion signals are received; the light is turn off or set to dim light while waiting for next motion signals.

4. The smart illuminating controller and the corresponding mobile apps, as recited in claim 3, wherein the mobile apps are able to set time delay for the groups and the major groups based on clock of the mobile; the time delay is set to a 24 hours cycle;

the light can be turned on at different times of a day, and the brightness can be set, as well as whether the light sensor and the motion sensor are used; wherein when choosing the motion sensor, the sensitivity and detection distance of the motion sensor can also be set; a variety of such programs can be pre-programmed for implementation from Monday to Sunday, for weekly loops, or on scheduled dates wherein when the light sensor is turned off, the luminous refers to output power; when the light sensor is turned on, the luminous refers to a required percentage.

5. The smart illuminating controller and the corresponding mobile apps, as recited in claim 4, wherein account permissions are set conveniently by the mobile apps; a administrator controls the whole smart illuminating system comprising of multiple smart illuminating controllers and the mobile apps for setting; users controls part or the whole smart illuminating controller under the authorization of the administrator; the account permissions are managed by user's name and password; different people is able to control the lightings according to different needs.

6. The smart illuminating controller and the corresponding mobile apps, as recited in claim 5, various lighting control programs are placed in the cloud, the users are able to download required control programs after downloading the mobile apps, also users can modify some data on the downloaded control program to meet the user's needs.

7. The smart illuminating controller and the corresponding mobile apps, as recited in claim 6, wherein the mobile apps are able to display fault indication for maintenance.

8. The smart illuminating controller and the corresponding mobile apps, as recited in claim 1, wherein the groups comprising transmitter and controller are able to access internet through Bluetooth and wifi and be controlled remotely.

* * * * *